United States Patent
Li

(10) Patent No.: US 7,567,168 B2
(45) Date of Patent: Jul. 28, 2009

(54) CAR REVERSAL RADAR THAT AUTOMATICALLY MODIFIES THE SENSOR SCANNING RANGE AND METHOD OF THE SAME

(76) Inventor: Shih-Hsiung Li, 8F-1, No. 23, Sec. 1, Hangchow S. Rd., Taipei (TW)

( * ) Notice: Subject to any disclaimer, the term of this patent is extended or adjusted under 35 U.S.C. 154(b) by 366 days.

(21) Appl. No.: 11/585,093

(22) Filed: Oct. 24, 2006

(65) Prior Publication Data
US 2008/0094193 A1    Apr. 24, 2008

(51) Int. Cl.
*B60Q 1/00* (2006.01)
(52) U.S. Cl. .............. 340/435; 701/301; 307/10.1; 340/436
(58) Field of Classification Search ............ 340/435, 340/436, 431, 932.2, 903; 701/1, 45, 150, 701/301, 36; 342/69, 70, 27, 89, 85, 118; 367/99, 112; 307/10.1
See application file for complete search history.

(56) References Cited

U.S. PATENT DOCUMENTS

| | | | | |
|---|---|---|---|---|
| 5,122,796 | A * | 6/1992 | Beggs et al. | 340/904 |
| 6,087,976 | A * | 7/2000 | Reed et al. | 342/70 |
| 6,348,889 | B1 * | 2/2002 | Ashihara et al. | 342/70 |
| 6,594,614 | B2 * | 7/2003 | Studt et al. | 702/150 |
| 6,940,398 | B2 * | 9/2005 | Li | 340/435 |
| 2003/0034883 | A1 * | 2/2003 | Sato et al. | 340/435 |
| 2004/0022416 | A1 * | 2/2004 | Lemelson et al. | 382/104 |
| 2005/0162261 | A1 * | 7/2005 | Li | 340/435 |
| 2005/0197770 | A1 * | 9/2005 | Schiffmann et al. | 701/301 |
| 2005/0268887 | A1 * | 12/2005 | Campbell | 123/406.59 |
| 2006/0103512 | A1 * | 5/2006 | Fukuda et al. | 340/435 |
| 2006/0206243 | A1 * | 9/2006 | Pawlicki et al. | 701/1 |
| 2007/0273490 | A1 * | 11/2007 | Fuchs et al. | 340/435 |

FOREIGN PATENT DOCUMENTS

DE    10 2004 005 960    8/2005

\* cited by examiner

*Primary Examiner*—Davetta W Goins
*Assistant Examiner*—Hoi C Lau
(74) *Attorney, Agent, or Firm*—Rabin & Berdo, P.C.

(57) ABSTRACT

A car reversal radar automatically modifies the sensor scanning range and the method of the same. The car reversal radar includes a central processing unit that has predetermined compensation value and threshold distance. When the car reversal radar starts, its surrounding environment is recorded into an initial detecting value. The initial detecting value is compared with a subsequent detecting value recorded for the environment when the car is being backed. When the subsequent detecting value is greater than the sum of the initial detecting value and the compensation value, the distance between an obstacle and the ultrasonic sensor of the car is compared with the threshold distance. If the former is greater than the latter, the compensation value is increased. Therefore, the obstacle has to even closer to the ultrasonic sensor to reduce the sensitivity of the ultrasonic sensors at the tail and to prevent incorrect actions.

10 Claims, 10 Drawing Sheets

US 7,567,168 B2

CAR REVERSAL RADAR THAT AUTOMATICALLY MODIFIES THE SENSOR SCANNING RANGE AND METHOD OF THE SAME

BACKGROUND OF THE INVENTION

1. Field of the Invention

The invention relates to a car reversal radar and, in particular, to a car reversal radar that automatically modifies its sensor scanning range and the method of the same.

2. Description of Related Art

In order for drivers to park the cars more safely and conveniently, cars are often installed with car reversal radars to avoid accidents caused by obstacles in the back. Common car reversal radars use ultrasonic sensors to send out ultrasonic waves and determine whether there is any obstacle by detecting the reflected waves. If the ultrasonic wave encounters an obstacle, it is reflected and received by the ultrasonic sensor. The actual distance between the obstacle and the sensor is then computed with the information of the speed of sound waves (340 m/s).

With reference to FIG. 4, the usual ultrasonic sensor 32 sends out fan-shaped ultrasonic waves, in stead of hemispherical. Therefore, there must be blind region 320 in the scanning region of the ultrasonic sensor 32. To minimize the blind region 320, the ultrasonic waves emitted by the ultrasonic sensor 32 should be as hemispherical as possible as shown in FIG. 5. However, the scanning region is too large in this case so that other obstacles that are not directly in the back of the vehicle may be detected. The driver is then misinformed to make possibly wrong decisions.

To solve the above-mentioned problem, some manufacturers design new ultrasonic sensors whose scanning region on the outer side is smaller than before. Such sensors are disposed on both edges in the back of the vehicles to prevent detection of obstacles on the sides of the cars. In this case, a vehicle has to be installed with two different types of sensors. Not only is this method difficult in installation and maintenance, it also increases the production cost.

SUMMARY OF THE INVENTION

It is therefore an objective of the invention to provide a method of automatically modifying the sensor scanning range of a car reversal radar. It dynamically adjusts the sensitivity of the sensors on both sides at the back of the vehicle to solve the problem of incorrect actions in the prior art.

To achieve the above-mentioned objective, the primary technical means applies the method to the central processing unit (CPU) of a car reversal radar. The method includes the following steps: predetermine compensation values for several ultrasonic sensors and a threshold distance; the several ultrasonic sensors send out ultrasonic waves to detect obstacles when the car reversal radar starts and obtain several initial sensing results thereof; the initial sensing results are stored as initial sensing values; the ultrasonic sensors keep detecting the obstacles to obtain subsequent sensing results thereof; the subsequent sensing results are stored as subsequent sensing values; when the subsequent sensing value of any of the ultrasonic sensors is greater than the corresponding "initial sensing value+compensation value," an obstacle is detected and the actual distance between it and the ultrasonic sensor is computed; if the actual distance between the obstacle and the ultrasonic sensors on both sides at the back of the vehicle is greater than the threshold distance (e.g. 60 cm), the compensation value is increased.

The above-mentioned technical means can determine whether any obstacle exists within the threshold distance. By increasing the compensation value, the condition of determining an obstacle is increased and thus the sensitivity of the ultrasonic sensors is reduced. This achieves the goal of dynamically adjusting the sensitivity of the sensors on both sides at the back of the vehicle. It prevents incorrect actions of the car reversal radar because it detects objects not directly behind the vehicle as its scanning range is too wide.

Another objective of the invention is to provide a car reversal radar that automatically modifies the sensor scanning range. It includes: a CPU; a memory unit; an ultrasonic transceiving module; a signal amplifying module and a warning module. The memory unit is connected to the CPU. The ultrasonic transceiving module emits and receives ultrasonic waves. It includes several sensor drivers and several ultrasonic sensors. The ultrasonic sensors are coupled to the CPU via the sensor drivers. The CPU controls and drives the ultrasonic sensors to emit ultrasonic waves. The signal amplifying module is connected between the CPU and the ultrasonic transceiving module for amplifying the signals received by the ultrasonic sensors before sending them to the CPU. The warning module is connected to the CPU for notifying the driver about any obstacle.

DETAILED DESCRIPTION OF THE PREFERRED EMBODIMENT

Figure 1:
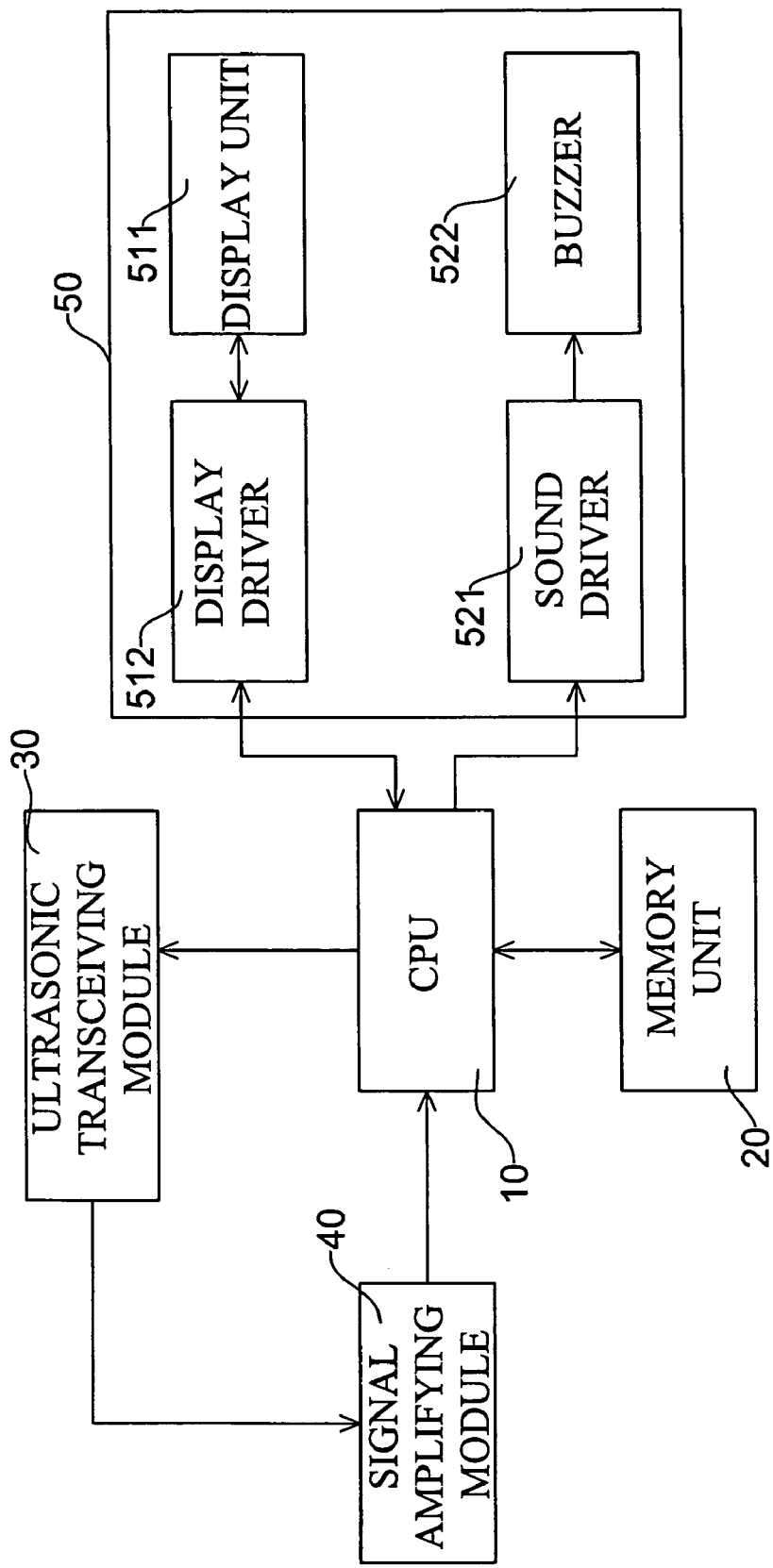
FIG. 1 is a block diagram of a car reversal radar in accordance with the present invention.

A preferred embodiment of the invention is illustrated in FIGS. 1 and 2. The disclosed car reversal radar includes a CPU 10, a memory unit 20, an ultrasonic transceiving module 30, a signal amplifying module 40, and a warning module 50.

The CPU 10 is the central processing device of the invention. This embodiment uses an ATMega8 microprocessor with 1 kb memory.

The memory unit 20 is connected to the CPU 10 for storing digital data. In this embodiment, the memory unit 20 is the memory inside the ATMega8 microprocessor.

Figure 2A:
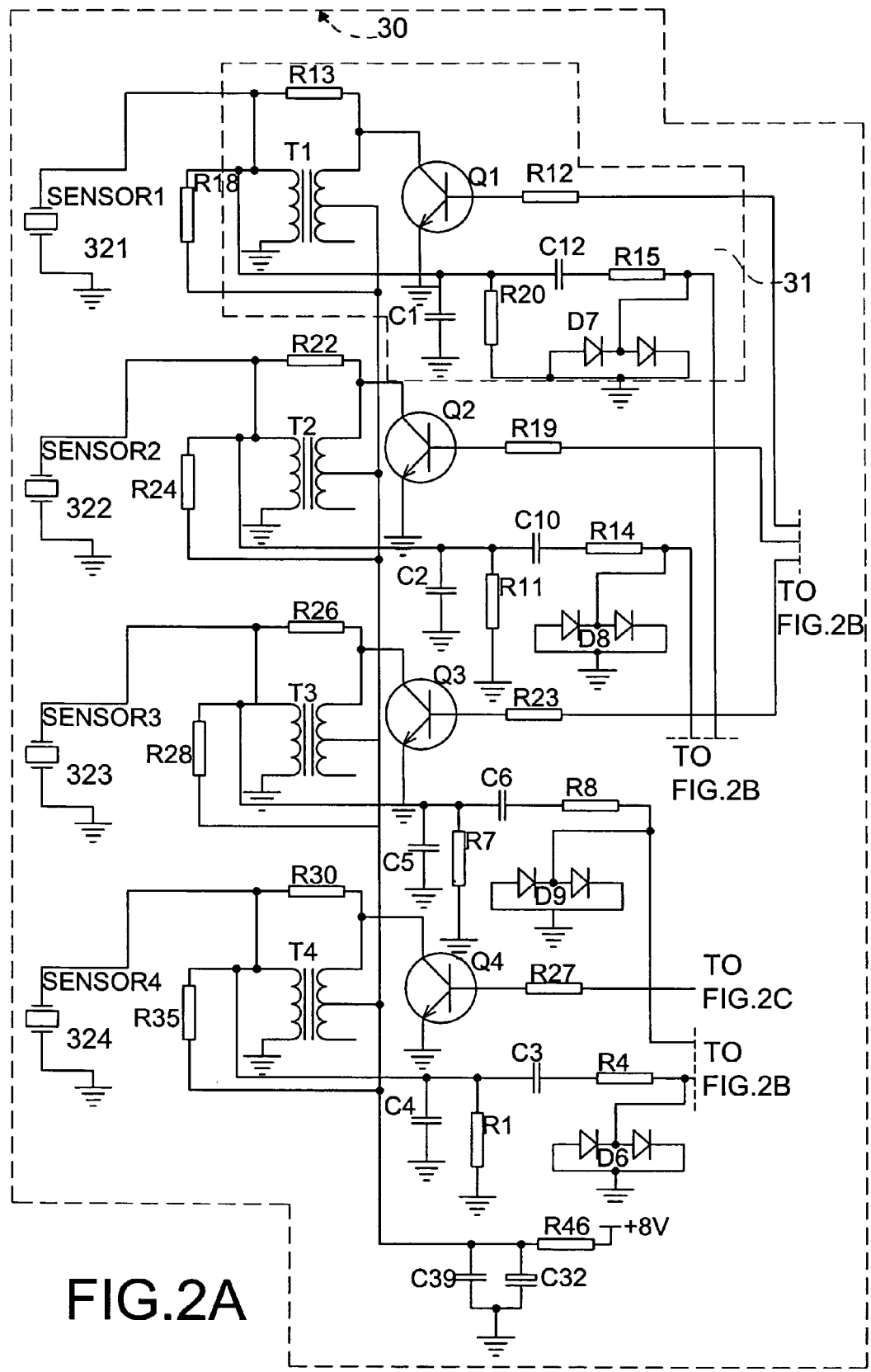
FIGS. 2A-2E is a circuit diagram of the car reversal radar in accordance with the present invention.
Figure 2B:
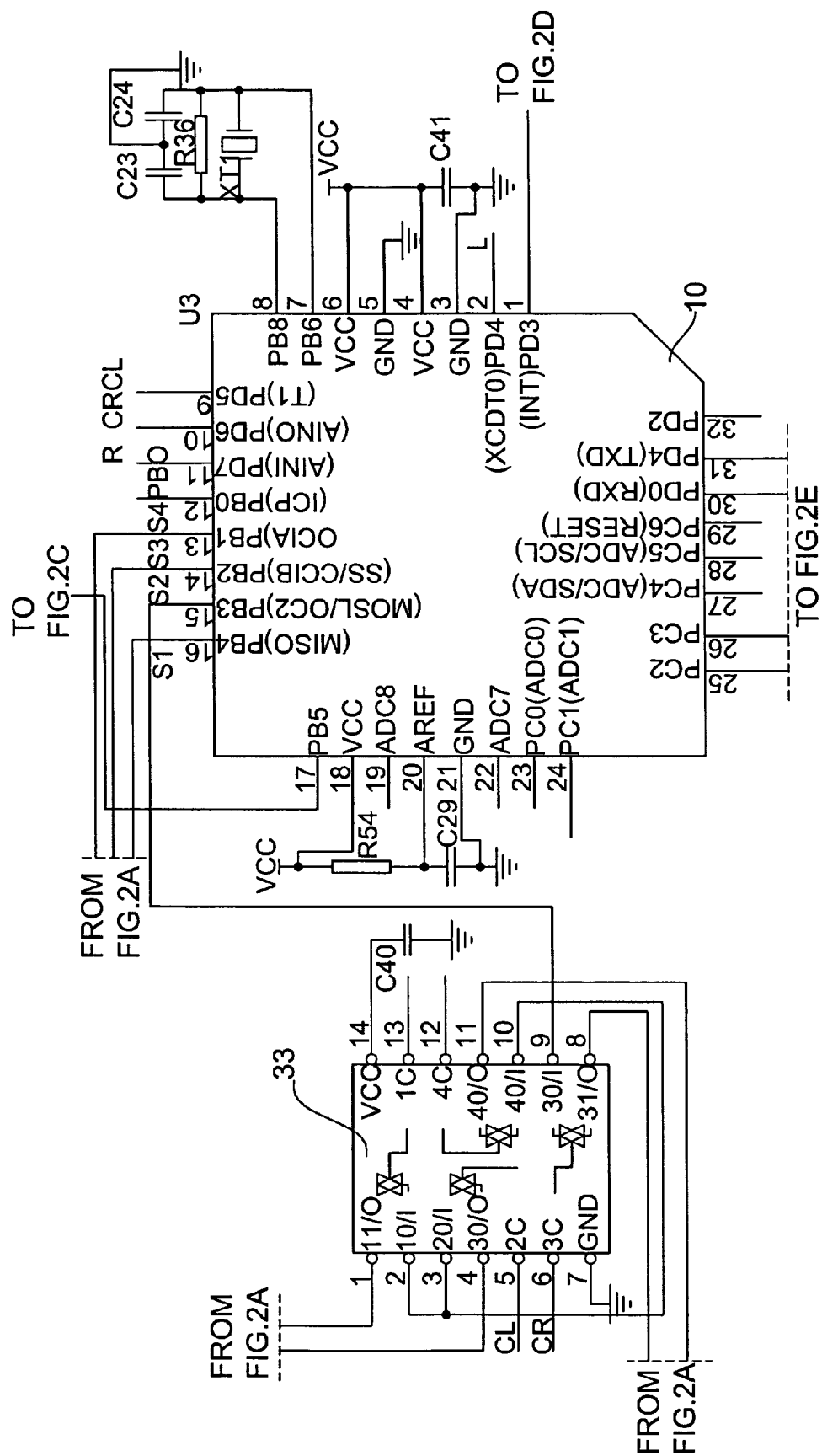

The ultrasonic transceiving module 30 is used to emit and receive ultrasonic waves. As shown in FIG. 2A, it includes four sensor drivers 31, four ultrasonic sensors 321, 322, 323, 324, and a multiplexer 33.

Each of the sensor drivers 31 includes a transistor Q1~Q4 and a transformer T1~T4. The bases of the transistors Q1~Q4 are connected to pins 13, 14, 16, 15 of the ATMega8 microprocessor, respectively. The pulse signal sent out by the CPU 10 is amplified by the transistors Q1~Q4 and the transformers T1~T4.

The ultrasonic sensors 321, 322, 323, 324 are connected to the CPU 10 via a sensor driver 31. In addition to using the pulse signal amplified by the transistors Q1~Q4 and the transformers T1~T4 to control and drive the ultrasonic sensors 321, 322, 323, 324 to send out ultrasonic waves, the ultrasonic sensors 321, 322, 323, 324 also receive ultrasonic waves reflected by the obstacles to generate a reflective signal.

The multiplexer 33 is connected to pin 9 and 10 of the ATMega8 microprocessor and the sensor drivers 31.

Figure 2C:
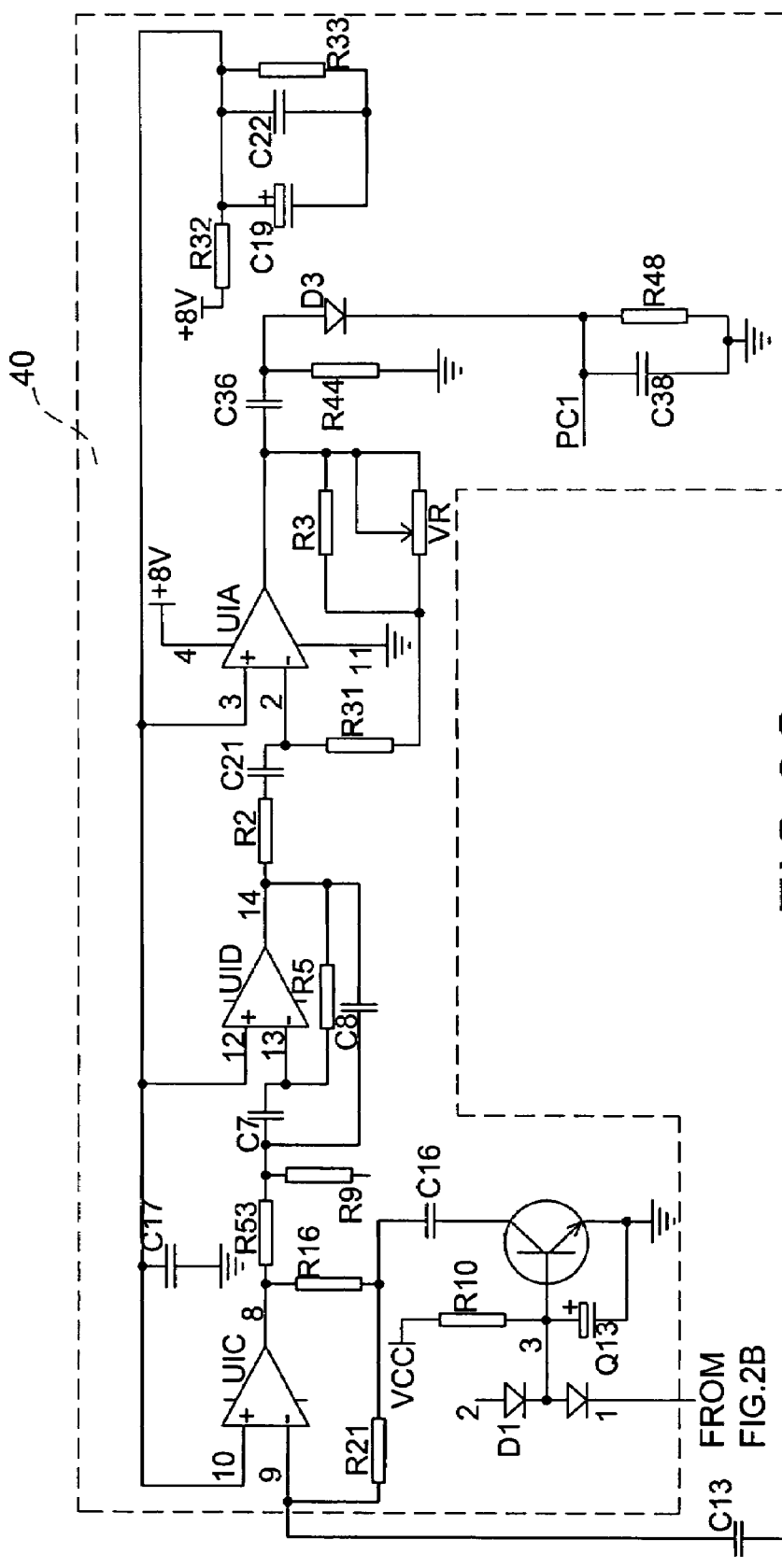
Figure 2D:
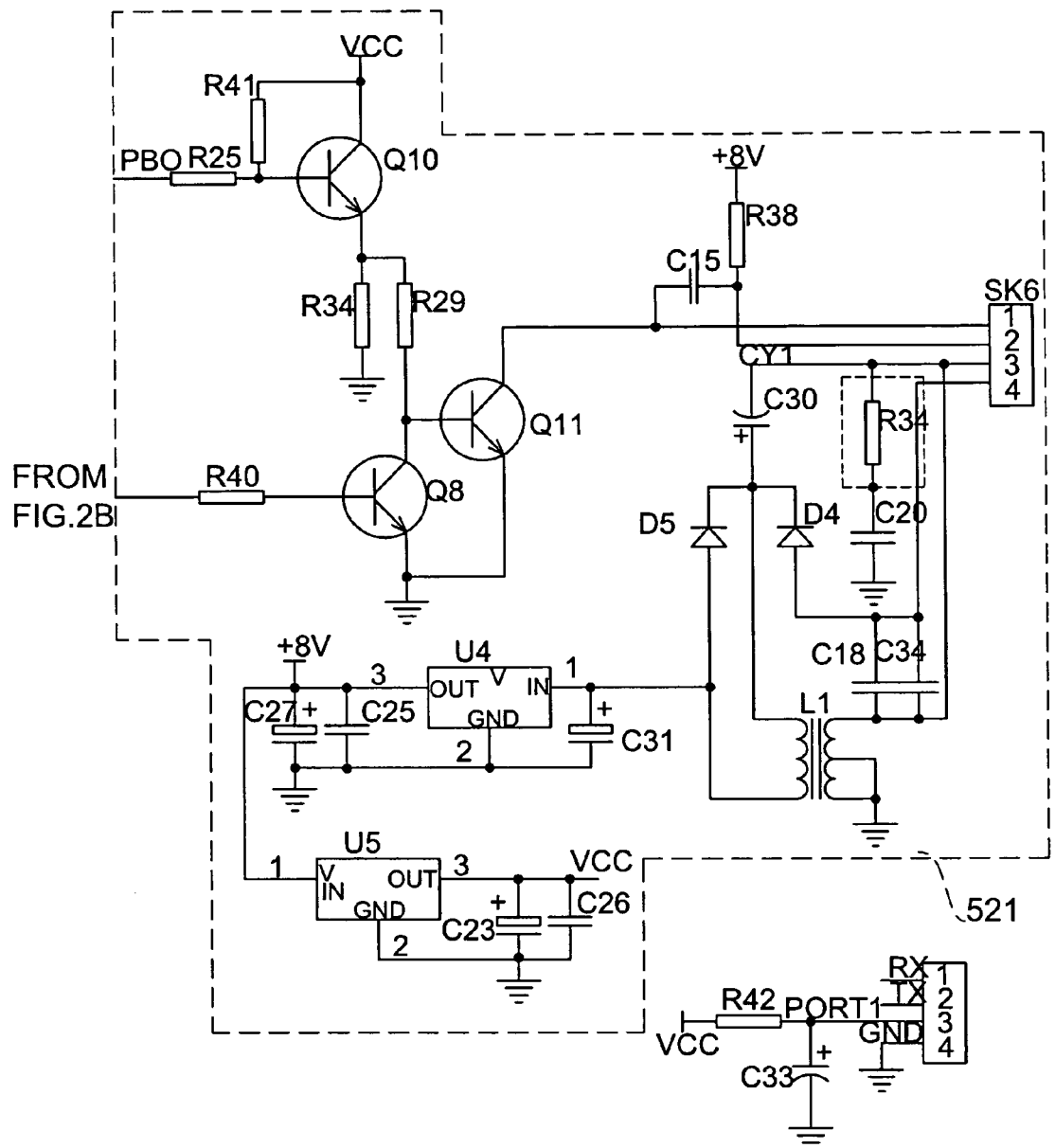
Figure 2E:
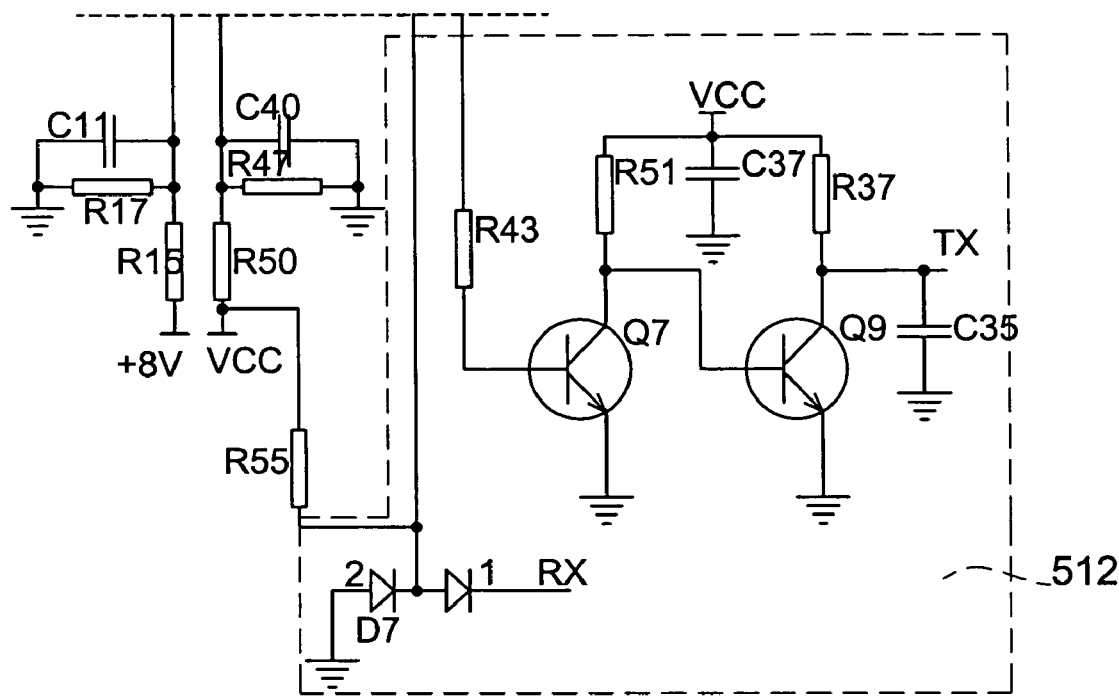

The signal amplifying module 40 is connected to pin 24 of the ATMega8 microprocessor and the multiplexer 33 of the ultrasonic transceiving module 30. Through the switch of the multiplexer 33, the reflected signals received by the ultrasonic sensors 321, 322, 323, 324 are sent to the signal amplifying module 40 for amplification before sending them to the CPU 10. In this embodiment, as shown in FIG. 2C, the signal amplifying module 40 consists mainly of three OP amplifiers U1C, U1D, and U1A. The amplifier U1C amplifies the reflected signals received by the ultrasonic sensors 321, 322, 323, 324 and sends them to a band pass filer comprised of the amplifier U1D, a resistor R5, and a capacitor C8 for removing noises. Finally, the reflected signals are further amplified by the amplifier U1A, rectified by a diode D3, and then sent to the CPU 10.

The warning module 50 is connected to the CPU 10 for notifying the driver about any obstacle. As shown in FIGS. 1 and 2, the warning module 50 in this embodiment includes a display unit 511 and a sound warning unit. The display unit 511 is connected to pins 30, 31 of the ATMega8 microprocessor via a driving circuit 512. The sound warning unit is a buzzer 522 connected to pins 1, 12 of the ATMega8 microprocessor via a sound driving circuit 521.

Figure 3A:
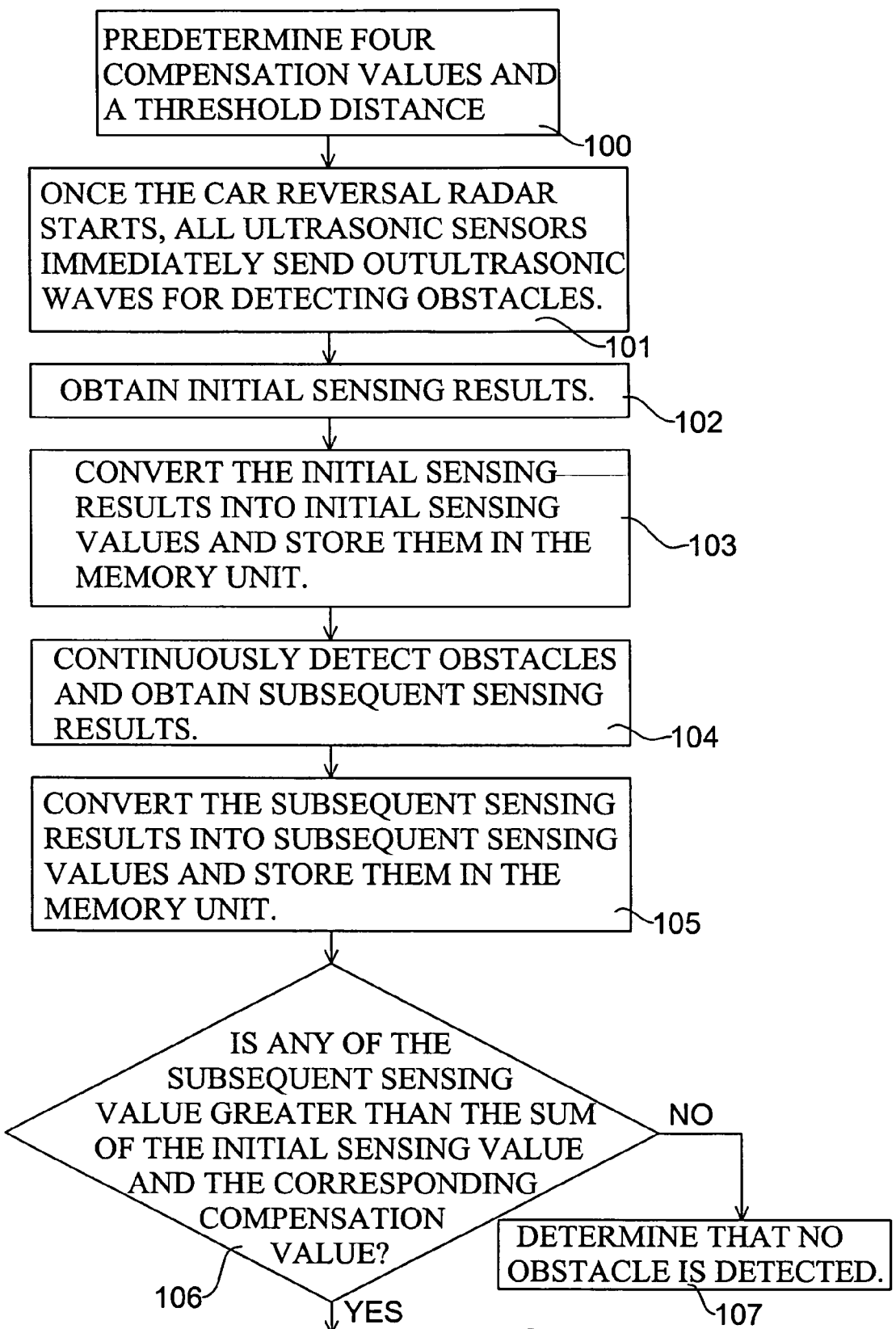
FIGS. 3A-3B is a flowchart of a method in accordance with the present invention.
Figure 3B:
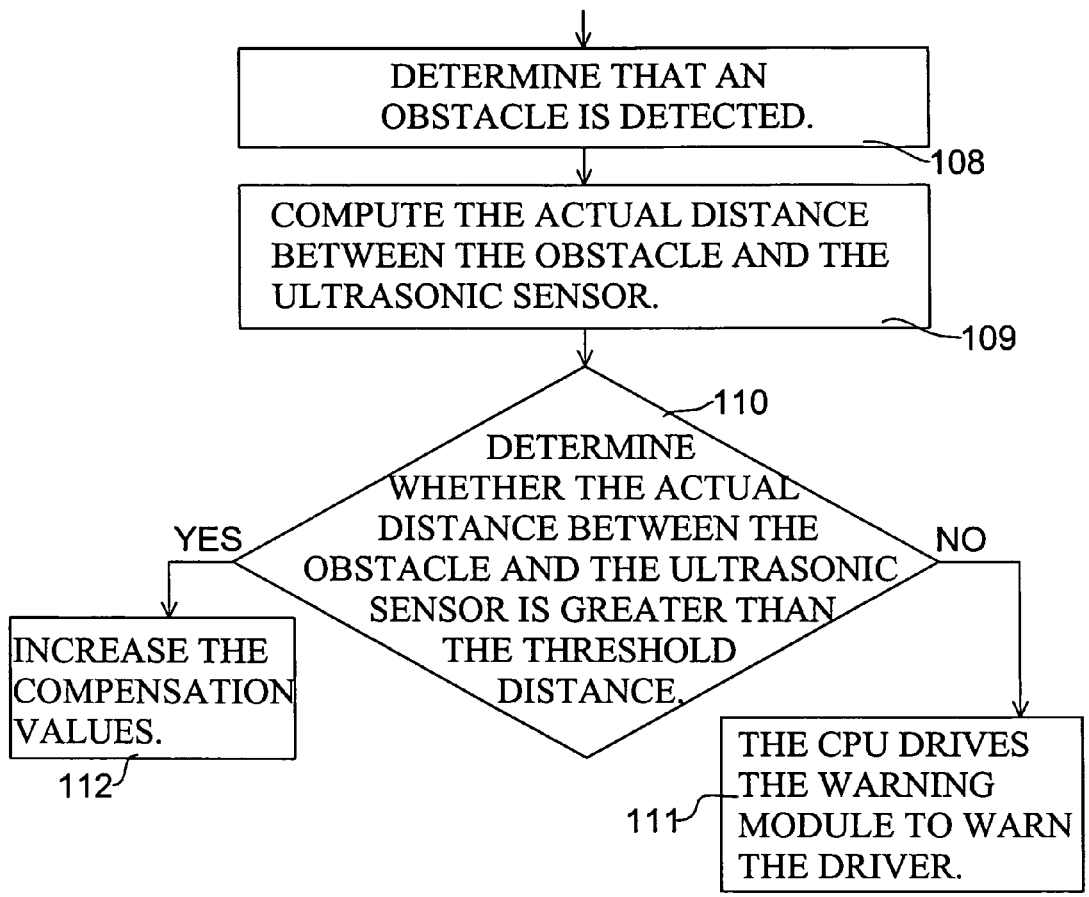
Figure 4:
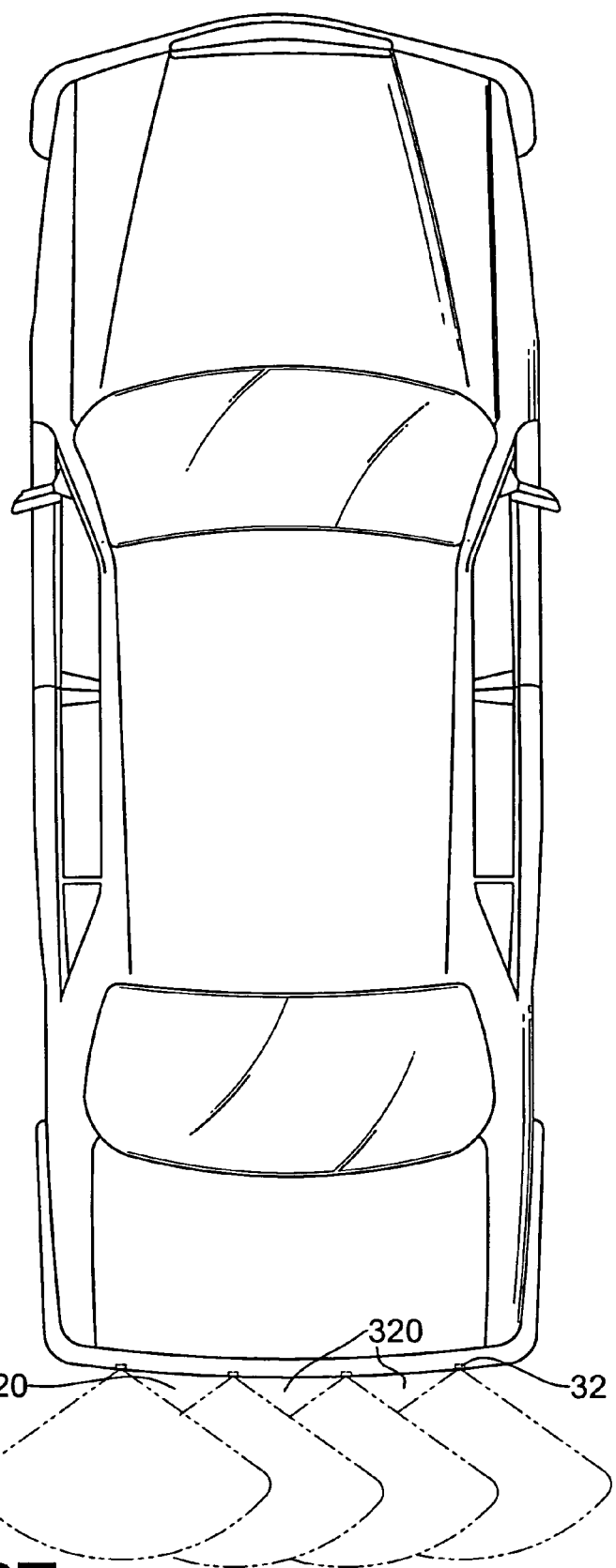
FIG. 4 is a schematic view of the scanning range of the ultrasonic sensor in a conventional car reversal radar.
Figure 5:
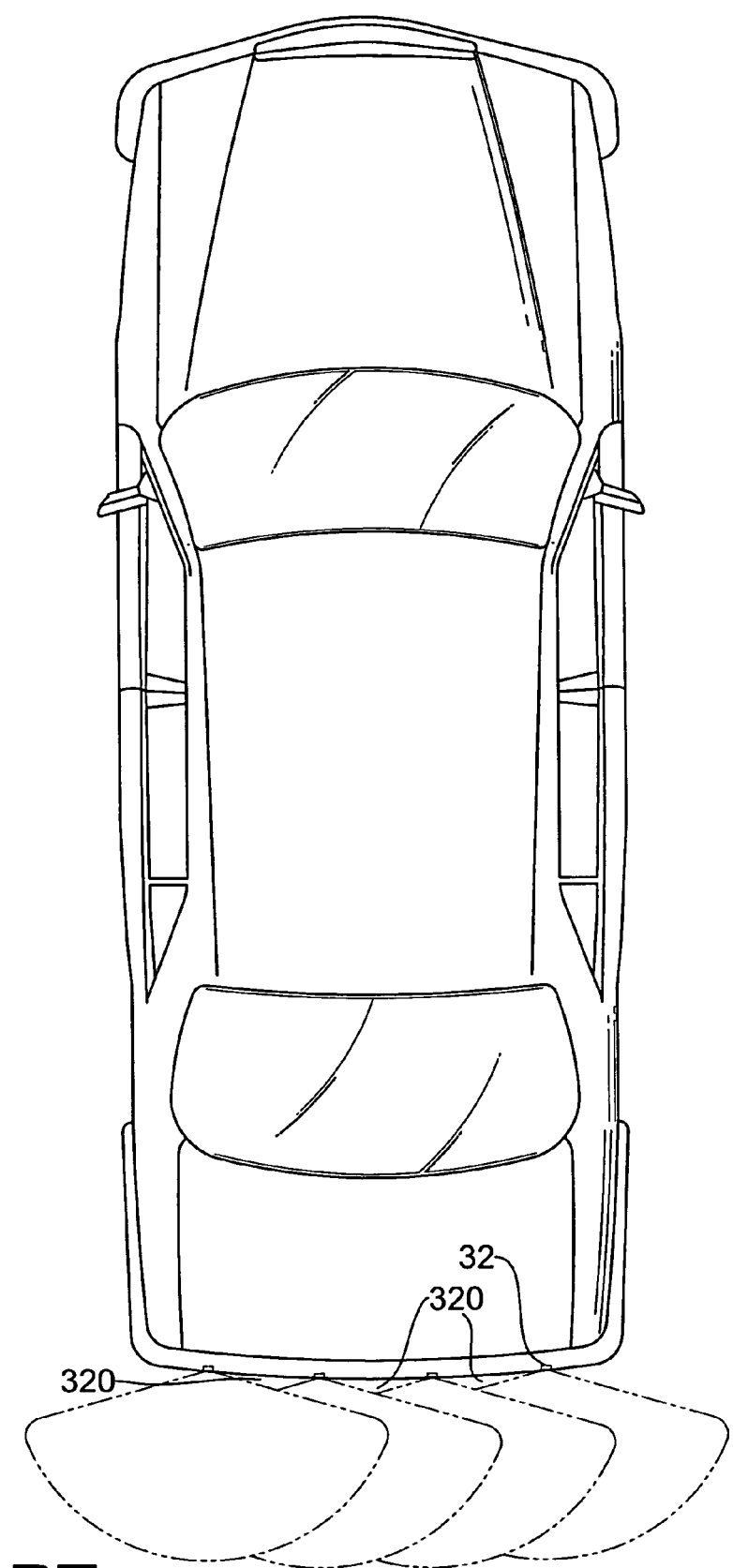
FIG. 5 is a schematic view of the scanning range of the ultrasonic sensor of a conventional car reversal radar.

The disclosed method of automatically modifying the sensor scanning range of a car reversal radar is applied to the above-mentioned CPU 10. Its working principle is based upon the fact that the energy of the ultrasonic waves reflected by an obstacle is proportional to the size of the obstacle. The larger the obstacle is, the more ultrasonic energy it reflects. With reference to FIGS. 3A-3B, the method includes the following steps.

First, four compensation values and a threshold distance are predetermined (step 100). Each compensation value corresponds to one of the ultrasonic sensors 321, 322, 323, 324. The threshold distance is set to be 60 cm according to a preferred embodiment of the invention.

After the car reversal radar starts, each of the ultrasonic sensors 321, 322, 323, 324 immediately sends out ultrasonic waves to detect an obstacle (step 101).

Each of the ultrasonic sensors 321, 322, 323, 324 receives the ultrasonic waves reflected by the obstacle to obtain several initial sensing results corresponding to the ultrasonic sensors 321, 322, 323, 324 (step 102).

The CPU 10 converts the initial sensing results into initial sensing values and stores them in the memory unit 20 (step 103).

Each of the ultrasonic sensors 321, 322, 323, 324 continues sending out ultrasonic waves for detecting obstacles and receiving ultrasonic waves reflected from the obstacles. Several subsequent sensing results of the ultrasonic sensors 321, 322, 323, 324 are thus obtained (step 104).

The CPU 10 converts the subsequent sensing results into subsequent sensing values and stores them in the memory unit 20 (step 105).

Afterwards, the subsequent sensing values of the ultrasonic sensors 321, 322, 323, 324 are compared with "initial sensing value+compensation value" (step 106) to determine is any of the subsequent sensing value greater than the sum of the initial sensing value and the corresponding compensation value. If not, then the radar determines that there is no obstacle within range (step 107). If so, then the radar determines that obstacles are detected within range (step 108).

Moreover, when an obstacle is detected, the actual distance between the obstacle and the ultrasonic sensors 321, 322, 323, 324 are computed using the speed of sound (340 m/s) and the interval between sending out the ultrasonic waves and receiving the reflected ultrasonic waves (step 109).

The computed actual distances between the obstacle and the ultrasonic sensors on both sides at the back of the vehicle are compared with the threshold distance (step 110). If the latter is larger than the former, then the CPU 10 drives the warning module 50 to send out a warning to the driver (step 111). Otherwise, the compensation value is increased (step 112), so that the sum "initial sensing value+compensation value" becomes larger. Therefore, a larger subsequent sensing value is required in order to be bigger than "initial sensing value+compensation value." That is, the size of the obstacle has to be larger or it has to closer to the vehicle. Therefore, the sensitivity of the ultrasonic sensors 321, 322, 323, 324 can be considered as lowered.

The working principle of the disclosed car reversal radar is described as follows.

Before a car is backed, it should have a larger distance to any obstacle. Therefore, less ultrasonic waves are reflected by the obstacle, resulting in a smaller initial sensing value.

As the car is backed, its distance to the obstacle may become smaller. The solid angle subtended by the obstacle to the car tail becomes larger, reflecting more ultrasonic waves. Therefore, the subsequent sensing value may be larger than the initial sensing value recorded before backing the car. Possible errors are avoided by requiring that the subsequent sensing value has to be larger than the sum of the initial sensing value and the compensation value.

When the actual distance between the obstacle and the ultrasonic sensors on both sides is greater than the threshold distance, it means that the obstacle may be on an outer side of the car tail. In this case, the sensitivity of the car reversal radar can be reduced by increasing the compensation value to prevent incorrect actions.

In summary, the disclosed car reversal radar first records the initial surrounding condition before the car is backed. It then compares the surrounding condition while the car is being backed with the initial surrounding condition to determine whether any obstacle exists. Once both sides of the car tail are determined to have no nearby obstacle, the invention automatically modifies the scanning range of the ultrasonic sensors on both sides at the back of the vehicle to reduce the sensitivity. This prevents incorrect actions of the car reversal radar from misguiding the driver.

What is claimed is:

1. A method of automatically modifying an ultrasonic sensor scanning range of a car reversal radar, comprising the steps of:

predetermining compensation values for ultrasonic sensors and a threshold distance;

when the car reversal radar starts, sending out ultrasonic waves from the ultrasonic sensors to detect any obstacle and obtaining initial sensing results from the ultrasonic sensors;

storing each of the initial sensing results as an initial sensing value;

continuously detecting obstacles using the ultrasonic sensors to obtain a plurality of subsequent sensing results from the ultrasonic sensors;

storing each of the subsequent sensing results as a subsequent sensing value;

when the subsequent sensing value of any of the ultrasonic sensors is greater than a corresponding sum of the initial sensing value and compensation value, determining that an obstacle is detected and computing an actual distance between the obstacle and the ultrasonic sensor; and if the actual distance between the obstacle and one of the ultrasonic sensors mounted on both sides at the back of the car is greater than the threshold distance, increasing the compensation value of the corresponding one of the ultrasonic sensors that detects the actual distance being greater than the threshold distance to reduce the sensitivity of the corresponding one of the ultrasonic sensors.

2. A car reversal radar, comprising:

a CPU;

a memory unit connected to the CPU;

an ultrasonic wave transceiving module that is used to emit and receive ultrasonic waves, the ultrasonic wave transceiving module including multiple sensor drivers and ultrasonic sensors; wherein each of the ultrasonic sensors is coupled to the CPU via one of the sensor drivers and controlled by the CPU to send out ultrasonic waves;

a signal amplifying module being connected between the CPU and the ultrasonic transceiving module for amplifying reflected signals received by the ultrasonic sensors and then sending them to the CPU; and a warning module connected to the CPU for generating a warning when an obstacle is detected;

wherein the memory unit stores compensation values for the ultrasonic sensors and a threshold distance;

when the car reversal radar is started, the ultrasonic sensors send out ultrasonic waves to detect any obstacle and obtain initial sensing results; the memory unit stores each of the initial sensing results as an initial sensing value; the ultrasonic sensors then continuously detect obstacles to obtain subsequent sensing results; the memory stores each of the subsequent sensing results as a subsequent sensing value; when the subsequent sensing value of any of the ultrasonic sensors is greater than a corresponding sum of the initial sensing value and the compensation value, an obstacle is detected, and the CPU computes an actual distance between the obstacle and the ultrasonic sensor; and if the actual distance between the obstacle and one of the ultrasonic sensors mounted on both sides at the back of the car is greater than the threshold distance, increasing the compensation value of the corresponding one ultrasonic sensor that detects the actual distance being greater than the threshold distance to reduce the sensitivity of the corresponding one ultrasonic sensor.

3. The car reversal radar of claim 2, wherein the ultrasonic transceiving module further includes a multiplexer connected to the CPU, the sensor drivers, and the signal amplifying module, wherein the multiplexer selects the reflected signals received by the ultrasonic sensors to be amplified by the signal amplifying module.

4. The car reversal radar of claim 2, wherein the warning module includes a display unit connected to the CPU via a display driver; and a sound warning unit including a buzzer connected to the CPU via a sound driving circuit.

5. The car reversal radar of claim 2, wherein the memory unit is built in the CPU.

6. The car reversal radar of claim 3, wherein the memory unit is built in the CPU.

7. The car reversal radar of claim 4, wherein the memory unit is built in the CPU.

8. The car reversal radar of claim 5, wherein the CPU is an ATMega8 microprocessor.

9. The car reversal radar of claim 6, wherein the CPU is an ATMega8 microprocessor.

10. The car reversal radar of claim 7, wherein the CPU is an ATMega8 microprocessor.

* * * * *